United States Patent [19]
Kuhlman

[11] 3,943,601
[45] Mar. 16, 1976

[54] MOLDABLE FOOD DEPOSITING APPARATUS

[76] Inventor: Harvey G. Kuhlman, 21466 Silver Spring Road, Menomonee Falls, Wis. 53051

[22] Filed: Apr. 10, 1973

[21] Appl. No.: 349,777

Related U.S. Application Data

[63] Continuation-in-part of Ser. No. 32,029, April 27, 1970, Pat. No. 3,725,974.

[52] U.S. Cl. .................................. 17/32; 100/218
[51] Int. Cl.[2] ............................................. A22C 7/00
[58] Field of Search ................. 17/32, 39; 425/437; 249/66 A, 66 C; 100/218, 179, 178

[56] References Cited
UNITED STATES PATENTS

| | | | |
|---|---|---|---|
| 1,757,447 | 5/1930 | Comstock .............................. | 17/32 |
| 2,021,794 | 11/1935 | Leone ..................................... | 17/32 |
| 2,356,634 | 8/1944 | Von Opel .............................. | 249/66 C |
| 2,500,973 | 3/1950 | Ackerman ............................ | 17/32 |
| 2,879,593 | 3/1959 | Schwartz ............................... | 17/32 |
| 2,889,574 | 6/1959 | Thielen et al. ........................ | 17/39 X |
| 3,101,761 | 8/1963 | Buehler et al. ........................ | 17/32 X |
| 3,183,551 | 5/1965 | Johnson ................................ | 425/437 |
| 3,550,189 | 12/1970 | Lotz ....................................... | 17/32 |
| 3,565,297 | 2/1971 | Bladt et al. ........................... | 100/218 |
| 3,588,948 | 6/1971 | Holly ..................................... | 17/32 |
| 3,591,026 | 7/1971 | Felstehausen ........................ | 17/32 X |
| 3,691,594 | 9/1972 | Klein ...................................... | 17/32 |
| 3,697,036 | 10/1972 | Kanbar et al. ........................ | 17/32 |
| 3,720,980 | 3/1973 | Gehlen et al. ........................ | 17/32 |
| 3,750,232 | 8/1973 | Holly ..................................... | 17/32 |

Primary Examiner—Robert Peshock
Assistant Examiner—James D. Hamilton
Attorney, Agent, or Firm—Andrus, Sceales, Starke & Sawall

[57] ABSTRACT

A pizza apparatus transfer plate having metering openings is selectively coupled to a pressurized meat source to form and apply meat patties. An air passageway is coupled to the meter openings and selectively wipe the meat from the plate. An air chamber is mounted on top of the meat chamber and connected by air tubes to bottom opening in the meat chamber. Alternatively, the metering plate openings is aligned with a metering piston having a concentric air passageway which is appropriately opened to wipe the meat from the plate. The metering plate is thus coupled to a meat source to fill the openings and then coupled to the air passageway to positively force the patties onto the bases. Individual patty forming and applying units are preferably provided and mounted in a pattern to directly correspond to the meat pattern on the completed pizza.

13 Claims, 7 Drawing Figures

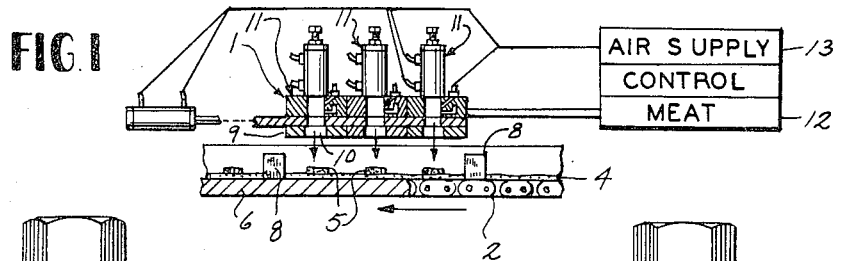
FIG. 1
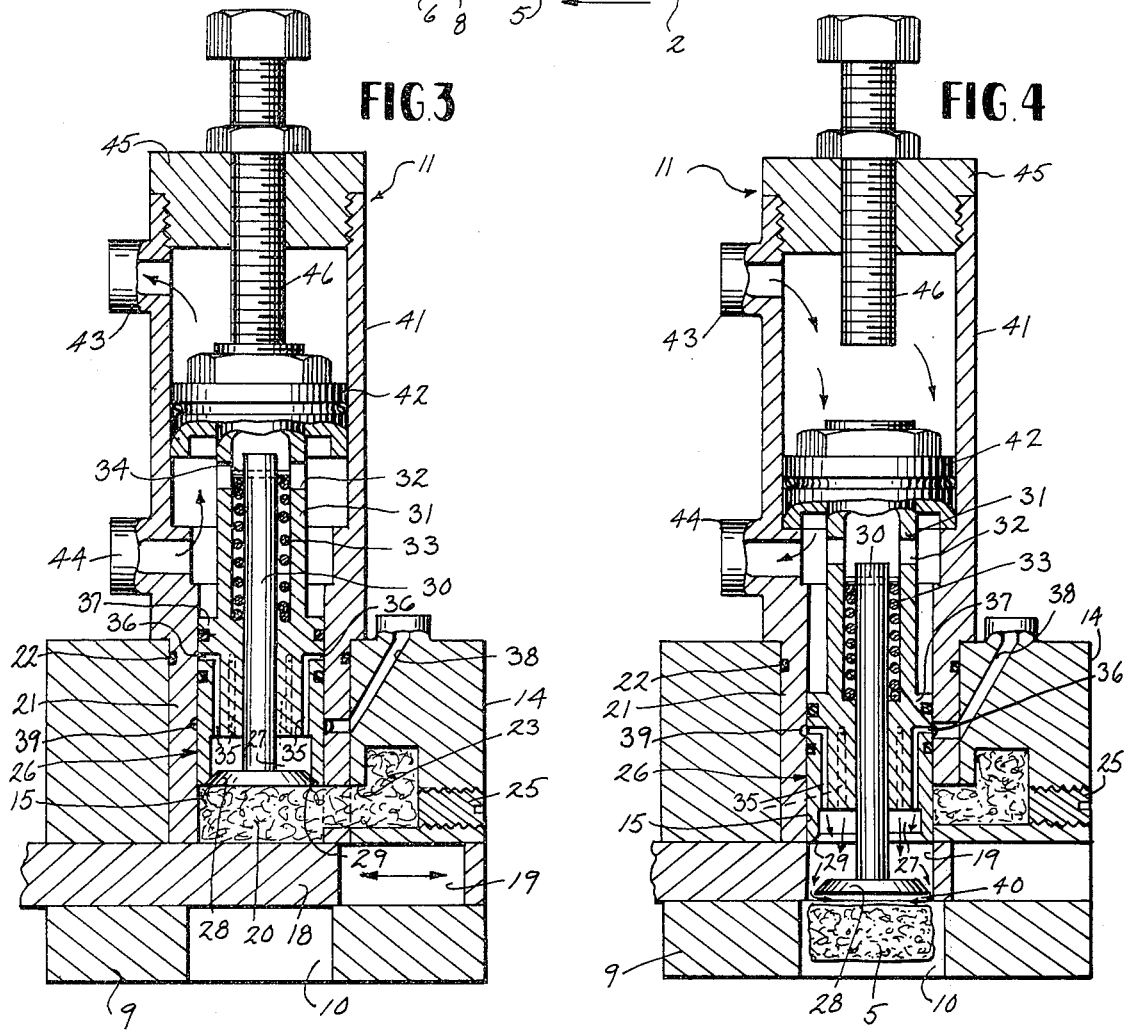
FIG. 3
FIG. 4
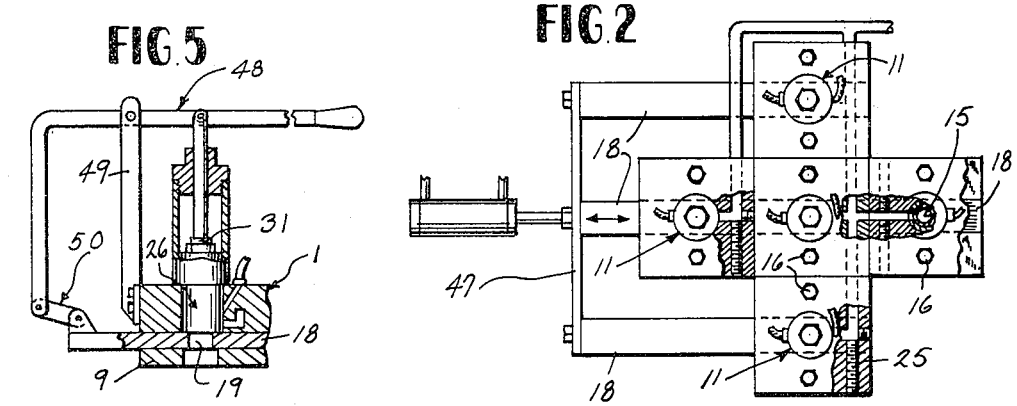
FIG. 5
FIG. 2

MOLDABLE FOOD DEPOSITING APPARATUS

BACKGROUND OF THE INVENTION

This application is a continuation-in-part application of my application filed Apr. 27, 1970 with Ser. No. 32,029 now U.S. Pat. No. 3,725,974 entitled "MOLDABLE FOOD DEPOSITING APPARATUS".

This invention relates to a moldable food depositing apparatus for applying preselected amounts of meat in individual patties or the like upon a base member such as a pizza crust or base.

In mass marketing of a food product such as pizzas, the cost may be substantially reduced if a satisfactory, automatic food-forming and packaging system can be provided. A highly satisfactory system for automatic forming of pizzas and the like is disclosed in U.S. Pat. No. 3,368,501, which issued to Harvey G. Kuhlman on Feb. 13, 1968. The apparatus disclosed therein discloses means for automatically and sequentially applying a sauce, a shredded chese and meat patties to pizza bases. The meat patties are applied through sequential transmission of the meat to openings within a transfer plate with the meat being removed through a plurality of depending fingers which extend downwardly and force the meat from the unit and onto the pizza bases. Although such apparatus provided satisfactory means for applying meat patties, depending upon the particular conditions encountered, such as temperature and the like, the meat may not remove from the applicator in a reliable and repeatable manner, particularly at high speed processing.

SUMMARY OF THE INVENTION

The present invention is particularly directed to an improved apparatus for the metering and depositing of meat to a pizza crust or the like. Generally, in accordance with the present invention, a transfer or metering unit is provided with meat metering openings. A meat source is coupled to the unit to fill the openings with the desired meat. In accordance with the present invention, the meat is transferred downwardly by a fluid removing medium onto the pizza bases with a forced application onto the bases producing a positive removal from the applicator unit and a position application to the base.

In accordance with a particularly novel feature and construction of the present invention, the meat applicators are formed with a metering base plate unit having a metering chamber or opening for selectively coupling to a meat source receiving the meat. A movable wall means preferably in the form of a piston unit is mounted within the opening and provided with automatic means for selectively positioning the piston unit within the opening to control the size of the pattie and amount of meat introduced into the opening. The opening is also provided with discharge openings aligned with the piston unit and having a releasable closure means. The piston unit includes a fluid supply connection and a valve means having a valve member as a part of the confining chamber wall. Opening of valve means introduces air into the metering opening to positively discharge the preformed meat unit. The valve means is automatically actuated by moving the piston unit downwardly in synchronism with opening of the closure means to provide alignment with an air source which is then applied to automatically open the valve structure and apply the air as a moving force directly to the meat pattie.

In accordance with a particularly novel construction the cylinder supports a piston unit, provided with a valve member defining the end face of the piston unit. The closure means is a plate slidably mounted abutting the bottom wall of base plate unit, and having an opening selectively aligned with the cylinder opening. The valve member is suitably slidably supported within the piston unit and resiliently loaded to the closed position. One or more circumferentially distributed L-shaped air passageways are provided in the piston terminating in contact with the cylinder wall. The air supply passageway is provided in the support and terminates on the cylinder wall for selective alignment with the piston unit as it moves to the discharge position. As the piston unit is retracted for filling of the metering opening, the air supply is automatically disconnected from the valve means. When the piston unit is moved downwardly to force the meat from the cylinder unit, the L-shaped air passageway, or a group of passageways, is aligned with the incoming supply passageway to provide automatic properly timed introduction of air into the cylinder to thereby automatically open the bottom wall. This not only provides for a rapid positive transfer but positively applies the meat pattie onto the base with a firm interconnection thereto. This thus provides a highly desirable satisfactory means for transferring of the medium to the basis.

The piston unit and closure means may be suitably positioned through a mechanical lever unit, a suitable hydraulic or fluidic drive system or the like to provide the proper timed movement of the elements. A piston-cylinder power unit connected to the top of the metering piston may be employed and driven from the same air supply provided to positively remove the meat patties. An adjustable mechanical stop is preferably provided to allow selection of patties of desired thickness.

In accordance with another novel construction the removal means includes a means to apply a fluid column of air or other suitable fluid directly upon the formed meat patties within openings in a metering plate to positively force them downwardly onto the aligned bases. This positively forces the patties onto the bases. In a particularly unique construction, the applicator includes a meat chamber with a metering plate forming a part of the lower wall of the chamber and an air chamber immediately above the meat chamber. A plurality of air conduits extend through the meat chamber and connect openings in the top and bottom walls of the meat chamber. The metering plate is slidably mounted adjacent the bottom wall and selectively aligned with the conduit openings and with the meat chamber. An air valve plate is slidably mounted adjacent the top wall of the meat chamber. The metering plate and valve plate are synchronously moved to selectively align the plate opening with the conduit for controlled transfer of meat patties onto the bases as the bases are aligned with the openings.

The present invention has been found to provide a highly satisfactory and reliable means for the rapid and positive transfer of meat patties and the like in accurately metered amounts to base members such as pizza crusts and the like.

BRIEF DESCRIPTION OF THE DRAWINGS

The drawings furnished herewith illustrate the best mode presently contemplated by the inventor for carrying out the subject invention in which the above advantages and features are clearly disclosed, as well as others which will be readily and fully understood from the following description of the illustrated embodiment.

In the drawings:

FIG. 1 is an enlarged side elevational view, partly in section, illustrating the construction of a meat applicator in accordance with the present invention;

FIG. 2 is a top plan view of the apparatus shown in FIG. 1;

FIG. 3 is an enlarged vertical section through a part of a meat-removing element shown in elevation in FIG. 1;

FIG. 4 is a view similar to FIG. 3 showing the apparatus in a pattie discharge position;

FIG. 5 is a fragmentary side view with parts broken away and showing an alternative construction in accordance with the teaching of this invention for positively applying meat patties to a base;

DESCRIPTION OF ILLUSTRATED EMBODIMENT

Figures 6, 7:
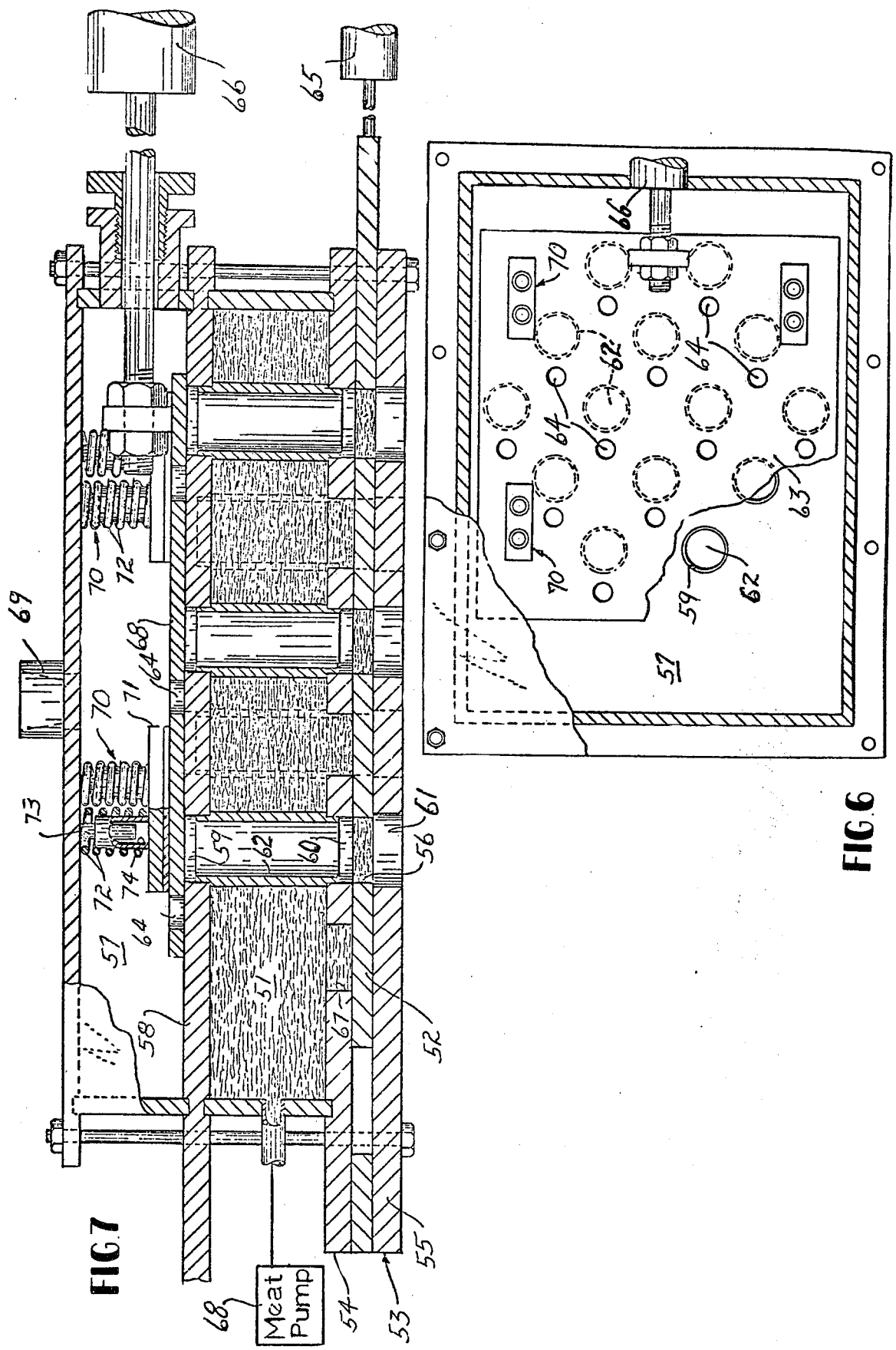
FIG. 6 is a fragmentary top view showing an alternative construction in accordance with the teaching of this invention for positively applying meat patties to a base.
FIG. 7 is an enlarged view taken generally on lines 7—7 of FIG. 6.

Referring to the drawings and particularly to FIG. 1, a meat applicator 1 is shown centrally located above a conveying belt unit 2 for transferring pluralities of aligned rows of pizza bases 4 beneath the meat applicator 1. The apparatus can be constructed to sequentially carry single pizza bases through the apparatus or laterally enlarged to carry additional pizza bases, as desired. Generally, the pizza bases 4, as fed to the meat applicator, may have had sauce and shredded cheese, not shown, applied thereto in any suitable manner, for example, as shown in U.S. Pat. No. 3,368,501, to Harvey G. Kuhlman and issued on Feb. 13, 1968. In passing through the meat applicator 1, a plurality of meat patties 5 are applied to each of the pizza bases 4.

Generally, in the illustrated embodiment of the invention shown in FIGS. 1–3, the meat applicator 1 includes a support or bed unit 6 formed of stainless steel or other material suitable for processing for supporting of the bases 4 as they pass through the meat applicator 1. A pair of conveyor chains 7 are mounted one each to the opposite sides of the applicator and a plurality of longitudinally spaced push elements in the form of bars 8 are secured thereto. The bars 8 span the bed unit 6 and project upwardly to define locating and engaging walls for carrying or pushing of the bases in lateral alignment along the bed through the applicator 1. The conveyor chains 7 are coupled to a suitable drive such as an electric motor driven clutch and brake assembly, not shown, which may suitably include a motor driving a clutch and brake unit which is coupled to a chain sprocket drive by a suitable gear reducer unit. Chains 7 are operated to establish a stepped movement of the pizza bases 4 such that each pizza base 4 is accurately aligned with and beneath a meat transfer base plate 9 having transfer openings 10 in the pattern of the meat patties 5 on a completed pizza base 4.

The illustrated embodiment of the invention includes a plurality of individual meat transfer units 11 aligned one each with the openings 10 and each of which is similarly constructed to apply the individual meat patties 5 to the base in a positive manner. The individual units 11 are formed as modules which are interconnected to form the applicator 1 with any desired pattern of meat patties 5 for application upon the base 4. As each unit 11 is similarly constructed, a single unit 11 is shown in detail in FIGS. 3 and 4 and described, with the corresponding elements of the other similar units identified by corresponding primed numbers and with the interconnection of the several units to a common meat source 12 and to a common air transfer source 13 particularly being described.

In particular each of the base units 11 includes a transfer plate or block 14 having a meat metering opening 15 of a cross sectional configuration corresponding to the desired peripheral configuration of the meat pattie 5. The blocks 14 are interconnected in spaced relation to the transfer plate 9 by suitable bolt means 16 or the like with suitable spacers 17.

A sliding closure plate 18 is slidably mounted within the space between the plates 9 and 14. Plate 18 has an opening 19 corresponding to the pattie forming or metering opening 15. The plate 18 is positioned selectively to close the metering opening 15 and aligned with the metering opening 15 for transfer of a pattie to the base through the transfer opening in plate 9. In the closed plate position, the metering opening 15 is coupled to the meat source 12 for introduction of the meat 20 thereto, as shown in FIG. 3.

In the illustrated embodiment of the invention, patties 5 are cylindrical flat patties and the metering opening is correspondingly cylindrical. A tubular liner 21 is secured within the opening forming a part of an automatic actuating means and is sealed thereto by a suitable O-ring seal 22.

The liner 21 and plate 14 is provided with a lateral opening 23 to a transfer passageway 24 extending normal to the lateral opening through the plate 14. The one outer end of the transfer passageway 24 is coupled to the meat source 12.

Where a plurality of units 11 are mounted to form a pattern, such, for example, as shown in FIG. 2, the passageways 24 are interconnected to provide for simultaneous transfer of the meat 20 to the plurality of the units 11. By locating of reversed units adjacent to each other as shown to the right in FIG. 2, a pair of the lateral transfer openings 23 and 23' are aligned with the one lateral passageway 24. The ends of the several passageways 24, which extend through plate 14 without operative connection to the meat source 12 are closed by suitable plug member 25.

A piston unit 26 is slidably mounted in the cylinder liner 26 and defines the top wall of the metering opening 15. Piston unit 26 is adapted to be raised and lowered with respect to the closure plate 18 which forms the bottom wall of meat forming pattie opening 15.

In accordance with the illustrated embodiment of the present invention, the piston unit 26 is specially formed with an end chamber or recess 27, the lower end of which is closed by a valve member 28 defining a flat top wall of the metering opening 15. The illustrated valve member 28 is thus a plate-like member spanning the complete bottom wall and bearing on a suitable valve seat 29 formed in the lowermost end of the cylindrical recess portion of a body portion of unit 26. The valve member 28 includes a stem 30 which projects backwardly through the piston shaft 31 and terminates within the piston unit. The end of the piston shaft 31 is provided with a laterally extending opening 32 permitting access to the outer end of the valve stem 30. The piston shaft 31 also is provided with an enlarged axial recess defining a spring chamber surrounding the stem 31. A cylindrical coil spring 33 encircles the outer portion of the stem 30 between the base of the recess and a coupling pin 34 extending through an appropriate opening in the stem 30. The coil spring 33 is compressed to continuously urge the valve member 28 to the closed position, with the valve member abutting the valve seat 29 as shown in FIG. 3.

The metering piston unit 26 further includes a plurality of equicircumferentially distributed L-shaped openings 35. Each of the L-shaped passageways 35 has a radial entrance portion 36 which extends from the periphery of the piston within the metering opening, and extends inwardly and then axially downwardly terminating within the base wall of the valved recess 27 in the piston unit 26. Suitable O-ring seals 37 are provided encircling the piston unit to the axial opposite sides of the laterally extending opening portions 36 and thus slidably seals the opening axially of the piston unit.

The passageways 35 are selectively coupled to the air source 13 through an air supply passageway 38 formed in the supporting plate 14 and extending laterally through the cylinder liner 21. A circumferential groove 39 in the liner provides coupling to all portions 36 with the proper axial alignment of the piston unit 26. The terminal portion of the supply passageway 38 is located such that it is aligned with the entrance portion 36, of the L-shaped passageway 35 with the piston unit moved downwardly to align the lower face of valve member 28 with the lowermost end or face of the plate 14. At that position, air is introduced into the valve chamber 27, forcing the valve member 28 outwardly, as shown in FIG. 4, to thereby mechanically further move the meat pattie into the transfer opening 10 and also transferring of the air stream 40 onto the pattie. The air appears to be partically trapped within the plate opening 19 between the pattie 5 and the valve member 28 to provide for a complete removal of the preformed meat pattie 5 from the face of the metering valve 28 and transferred under the positive driving force onto the pizza base. The air force of stream 40 is selected to positively transfer the pattie and ensure its positive placement onto the base, thereby maintaining firm engagement on the base during the subsequent processing.

The piston unit 26 is positioned between the raised pattie forming postion and the discharge position through any suitable means. In the illustrated embodiment of the invention, FIGS. 1 – 4, a pneumatic positioning system is provided including a power cylinder 41 formed as an extension of the cylinder liner 21. A piston 42 is secured to the outer end of the metering piston shaft 31 in any suitable means and is slidably disposed within the power cylinder 41. Axially spaced air inlet-outlet connectors 43 and 44 are provided to the opposite sides of the piston 42 at the opposite ends of the cylinder 41, the outermost end of which is provided with a suitable closure 45. An adjustable stop member 46 is threadedly provided in the outer wall closure 45 for limiting the upward or the retracted movement of the meat forming piston unit 26. This then determines the spacing of the piston face defined by the valve member 28 with respect to the closure plate 18 and thereby determines the amount of meat 20 which will be transferred to form a pattie 5 of a particular size. In operation, the air is supplied to the lower end of the power piston unit via connector 44 to raise the piston unit 26 until it engages the stop member 46.

The meat 20 is then introduced into the metering opening 15 under a selected controlled pressure to introduce a very accurate amount of the meat. The pressure source is removed, and the closure plate 18 automatically transferred to align the discharge opening 19 with the metering opening 15 of the plate 14. The pressure on the power cylinder 41 is then reversed and the piston 42 and attached piston unit 26 move downwardly forcing the preformed meat pattie 5 outwardly into the closure opening 19 in the closure plate 18. As the piston unit 26 moves downwardly, the air transfer passageways 35 and particularly the entrance portions 36 are aligned with the air supply passageways 38 and 39. Air is thus introduced into the valve chamber 27 causing the valve member 28 to move downwardly further forcing the pattie 5 through the opening 19 of the closure plate 18. Simultaneously, air moves about the valve member 28 and is trapped between the valve member 28 and the pattie 5 to rapidly build-up a fluid transfer force which wipes across the face of the valve member 28 and pattie and positively drives the patties downwardly and upon the base 4.

As shown, each of the base units is formed of a relative small rectangular block somewhat larger than the pattie 5. The units 11 may be interconnected as shown, with the air supply connected in common for timed and synchronized transger of the meat patties 5. Several separate closure plates 18 are shown for the offset units 11. The plates 18 are interconnected as by a bracket 47 to simultaneously and correspondingly open and close the several metering openings 15 of each of the several units 11 at the appropriate time. Thus meat 20 is supplied to each opening 15 and subsequently all plates 18 are moved to discharge position of FIG. 4.

The present invention provides a means to positively transfer the preformed metered meat quantities or units in a rapid and reliable manner while permitting convenient pattern forming.

Although the movement of the piston units and closure plates are shown with a pneumatic drive, a suitable mechanical linkage, for example, as diagrammatically shown in FIG. 5 may also be employed. In this embodiment the upper end of the piston shaft 31 extends outwardly of the unit and is connected to a pivotally mounted lever 48 connected to a pivot support 49. A pivot linkage 50 interconnects the lever 48 to the closure plate 18. Raising of the lever 48 simultaneously withdraws the piston unit 26 and moves the closure plate 18 to close the metering opening, which is then filled with meat. The lever 48 is depressed and first moves the plate 18 to align the opening 19 with the metering opening 15, and then mechanically moves the piston unit 26 downwardly to force the meat pattie 5 into the closure plate opening 19. The downward movement of unit 26 also establishes corresponding alignment between an air supply passageway 38 and the valve chamber passageways 35, as in the first embodiment, to provide for the automatic forced discharge of the meat pattie 5 from the unit.

In FIGS. 6 and 7 a further alternative embodiment is shown having means for positively moving and transferring of the meat patties from a metering plate with a positive pressurized fluid force.

In FIGS. 6 and 7, a transfer structure for applying meat patties to one base 4 is shown. The structure would also be duplicated and mounted across the conveying means for applying the meat patties to a row of bases 4. Referring particularly to FIGS. 6 and 7, an essentially closed meat chamber 51 is provided having a metering plate 52 slidably mounted as a part of the bottom wall 53. The bottom wall 53 is provided with an upper plate 54 and a lower spaced plate 55 between which the metering plate 52 is slidably mounted. The plate 52 includes a plurality of distributed metering openings 56 in accordance with the desired distribution of patties 5 and bases 4.

An air chamber 57 is formed immediately above the meat chamber 51 with a common wall 58 therebetween. The common wall 58 and bottom wall plates 54 and 55 are correspondingly apertured as at 59, 60 and 61 in accordance with the apertures or openings 56 in the metering plate 52. Suitable conduits or pipes 62 are sealed within the respective aligned openings in the upper wall 58 and the upper plate 54 of the bottom wall to maintain the essential closure of the meat chamber 51. This provides, however, for communication from the air chamber 57 to the metering plate 52 such that when the metering openings 56, each filled with a meat pattie, are aligned with the air passage conduit 62, air can move downwardly to force the patties 5 from the openings 56 and onto an aligned pizza base 4.

An air valve plate 63 is slidably mounted adjacent the top of the common wall and includes valve openings 64 to selectively connect the passageways defined by conduits 62 to the air chamber 57 and thereby provide for the selected application of air pressure.

In the illustrated embodiment of the invention, similar air cylinder units 65 and 66 are provided and interconnected respectively to the metering plate 52 and the air valve plate 63. The cylinders 65 and 66 are actuated in timed relation to correspondingly position the air valve plate 63 and the metering plate 52.

More particularly, the meat metering plate 52 is constructed with the openings 56 distributed within the plate in accordance with the distribution of the desired meat patties 5 on the pizza base 4. The air passageways 62 are similarly distributed within the structure. For example, a typical distribution is shown by the openings in FIG. 6. Thus, the meat patties are distributed in a plurality of rows, each of which includes a different number of the patties and in which the patties are spaced from each other by a distance greater than the size of the patties. In accordance with the present invention, the metering plate 52 is shifted by actuation of the air cylinder 65 from the air passageways to locate the metering openings 56 intermediate the air passageways 59 and in alignment with transfer openings 67 in the upper plate 54 of the meat chamber bottom wall 53.

The meat chamber 53 is connected to a positive displacement pump 68 or other suitable source to maintain the meat chamber 53 filled with the desired meat and under a positive pressure such that with the metering plate 52 located to align the metering openings 56 with the transfer openings 67, meat is forced downwardly under a predetermined pressure into the metering openings 56. When the metering plate 52 is shifted back to the discharge position, a very accurate metered amount of meat is held within the opening 56. The openings 60 and 61 in the upper and lower plates 54 and 55 of the bottom wall 53 are somewhat larger than the metering openings 56. However, the meat will inherently be retained within opening 56 due to the interaction between the side walls and the meat. Patties 5 are thus held within the opening 56 until an air column is applied to the upper end through the air passageways 62 to positively drive the meat patties 5 downwardly onto the pizza base 4.

In the illustrated embodiment of the invention, the air chamber 57 generally corresponds to and overlies the meat chamber 51. The upper wall of the air chamber 57 is connected to a suitable air inlet 69 to establish a predetermined constant air pressure within the chamber 57.

The air valve plate 63 is provided with the plurality of openings 64 somewhat smaller than the passageways 62 and selectively positioned with the openings 64 in alignment with the passageways 62 or shifted therefrom such that a continuous portion of the plate 63 covers the openings to seal them. The air valve plate 63 is held in pressure-sliding engagement by a plurality of similar pressure units 70 distributed throughout the air chamber and bearing on the top side of the sliding valve plate 63. As each is identically constructed, a single unit is described.

The pressure unit 70 includes a pressure bar 71 having a Feflon undersurface slidably bearing on the plate 63 to permit establishment of a relatively firm downward pressure on the air valve plate 63 without interfering with the movement thereof.

The pressure bars 71 are biased into engagement with the valve plate 63 by a pair of coil springs 72 acting between the underside of the top wall of the air chamber 57 and the back or top surface of the pressure bar 71. Suitable guide pins 73 are secured to the top wall of the air chamber 57 and project downwardly into guide cylinders 74 attached to the pressure plate. The pressure springs 72 encircle the guide assembly to maintain the springs between the pressure plate and the chamber wall.

In summary, the embodiment of the invention illustrated in FIGS. 6 and 7 provides for the timed energization of the operating air cylinder units 65 and 66 coupled to the metering plate 52 and the valve plate 63 in predetermined timed relationship with respect to the movement of the pizza bases 4 into alignment with the transfer openings 61. A row of pizza bases 4 will be stepped into alignment to receive the meat. The metering plate 52 is positioned with the transfer openings 56 aligned with the air passageways 62 and the air valve plate 63 is then positioned with valve openings 64 aligned with the air passageways. This will result in direct transfer of the meat patties under the column of air pressure transmitted through the passageways 62. The patties 5 are thereby positively driven downwardly onto the pizza bases 4. The air valve plate 63 is then positioned to close the air passageways and remove pressure from the passageways 62. The metering plate 62 is then returned to align the metering openings 56 with the filling openings 67 to refill the metering openings 56 in the same manner as previously described. During this period, the filled pizza bases 4 are stepped forwardly and a new row of pizza bases 4 are aligned with the transfer openings 56 in the plate 55.

Although particularly described in connection with substantial meat patties, the metering plate 52 may be formed with a very substantial number of closely spaced openings to transfer the meat as a widely dispersed, granulated meat which essentially completely covers the pizza base, similar to the present hand application of ground meat. The meat may be wholly or partially cooked to form a granulated form of meat for convenient transfer.

The air transfer means thus provides another means of ensuring positive application of the meat patties to the pizza bases in an accurately metered manner.

The present invention thus provides a forced application of the metered amount of meat or other food product to the base member and particularly provides a highly practical and reliable means for mass production of pizza units.

Various modes of carrying out the invention are contemplated as being within the scope of the following claims which particularly point out and distinctly claim the subject matter which is regarded as the invention.

I claim:

1. A food depositing apparatus to apply predetermined amounts of food patties to a base, comprising conveying means for supporting said base, a mechanical forming means to preform at least one pattie, and a fluid means having an output fluid stream selectively impressed after the forming of the pattie upon the one face of the preformed pattie and thereby positively forcing the pattie from said mechanical forming means and onto said base, said forming means includes a metering plate having an opening corresponding to the pattie, and valve means coupled to selectively apply said fluid stream upon the top side of the pattie.

2. A food depositing apparatus to apply predetermined amounts of food patties to a base, comprising conveying means for supporting said base, a mechanical forming means to preform at least one pattie, and a fluid means having an output fluid stream selectively impressed after the forming of the pattie upon the one face of the preformed parts and thereby positively forcing the pattie from said mechanical forming means and onto said base, said forming means includes a supporting plate having a metering opening and a meat supply passageway for filling said opening, a metering piston slidably mounted in the opening and defining an adjustable top wall for controlling the depth of the pattie, a closure means selectively opening and closing the bottom of the metering opening, said piston having a valve means in the lower surface, and means selectively supplying said fluid means to said piston and operable to open said valve means and impress said fluid stream on said preformed pattie.

3. The food depositing apparatus of claim 2 wherein said piston unit includes a main body portion having a bottom recess, said valve means including a plate-like valve member and a resiliently loaded valve stem slidably supporting said valve member in abutting relation to the bottom of the recess, a plurality of equicircumferentially spaced L-shaped air passageways in said body portion, each of said passageways extending radially from outer surface of the body portion and axially to said recess, said metering plate having an air supply passageway terminating in a circumferential groove in the wall of the metering opening for alignment with the L-shaped air passageways at a selected position of the piston unit.

4. The food depositing apparatus of claim 3 wherein said piston unit includes a hollow shaft portion with said stem slidably mounted therein, a spring stop means on the outer end of the stem, a coil spring encircling said stem between the spring stop means and the piston shaft to continuously urge the stem to the retracted position with the valve member abutting the body portion.

5. The food depositing apparatus of claim 3 having a power cylinder unit for selectively positioning of the piston unit in said metering opening to meter the size of the meat pattie.

6. The food depositing apparatus of claim 3 having a mechanical positioning means coupled to the piston unit and to the closure means to establish timed movement therebetween.

7. The food depositing apparatus of claim 8 wherein said mechanical positioning means includes means to preset the movement of the piston unit and thereby preset the size of the meat pattie.

8. A food depositing apparatus to apply predetermined amounts of food patties to a base, comprising conveying means for supporting said base, a plurality of mechanical forming means to establish a preselected pattern of patties, each of said forming means including a separate metering plate having a metering opening for receiving of the food and preforming of the food to a preselected size and configuration, a closure plate means slidably mounted beneath said metering plate and having an opening for selective alignment with the metering opening, a piston unit slidably mounted within the metering opening for transferring of the preformed pattie from the metering opening, said piston unit having a valved opening in the working face for coupling to said fluid means in response to alignment with the opening in the closure plate with the metering opening, control means coupled to simultaneously and correspondingly position the closure plate means and the piston units for each forming meats, and a fluid means having an output fluid stream selectively impressed after the forming of the pattie upon the one face of the preformed pattie and thereby positively forcing the pattie from said mechanical forming means and onto said base.

9. A food depositing apparatus to apply predetermined amounts of food patties to a base, comprising conveying means for supporting said base, a forming means including a multiple pattie transfer plate assembly having a plurality of openings, each of said openings being selected to accommodate a single cylindrical pattie, a fluid means, and a plurality of air passageway means coupled to the fluid means and selectively aligned with said openings to simultaneously apply a pressurized air column on said patties to compress said patties onto an aligned base.

10. A food depositing apparatus to apply predetermined amounts of food patties to a base, comprising conveying means for supporting said base, and depositing means to apply at least one pattie to said base and including force means to positively force each pattie onto said base, said depositing means includes a metering plate having a plurality of confining openings of a predetermined size, means to fill said openings with a self-supporting food product to establish a preformed pattie within each of said opening, and said force means includes fluid pressure means operably connected to the openings after the forming of said patties to apply a fluid pressure medium to the openings and to the patties within said openings to transfer and compress said food patties against said base, said depositing means including a multiple pattie metering plate having a plurality of spaced metering openings with the spacing exceeding the size of the adjacent openings, each of said openings being selected to accommodate a single cylindrical pattie, a meat chamber having a bottom wall with a first group of openings and a second group of openings spaced in accordance with said metering openings, said fluid pressure means connected to the first group of openings to transfer the patties onto an aligned base and to compress said patties onto the base, a motor means coupled to said metering plate to align said metering openings with said first and second groups of openings, said second group of openings communicating directly with the meat chamber.

11. The apparatus of claim 10 having a positive displacement meat pump connected to said meat chamber to supply ground meat to said chamber and to maintain said chamber at a selected pressure.

12. The apparatus of claim 10, wherein said fluid pressure means includes an air chamber secured to the top of said meat chamber and connected to said first group of openings by fluid tubes extending through said meat chamber, an air valve plate slidably mounted in said air chamber and having valve openings, one for each tube, and motor means connected to said air valve plate to selectively position the air valve plate.

13. The apparatus of claim 12, wherein said fluid pressure means includes a plurality of pressure bars engaging the top of said air valve plate, and spring means between the bars and the top of the air chamber to apply a pressure to the bars and hold the valve plate in sliding engagement with a wall of the air chamber.

* * * * *

UNITED STATES PATENT AND TRADEMARK OFFICE
CERTIFICATE OF CORRECTION

PATENT NO. : 3,943,601
DATED : March 16, 1976
INVENTOR(S) : HARVEY G. KUHLMAN

It is certified that error appears in the above-identified patent and that said Letters Patent are hereby corrected as shown below:

| | | | |
|---|---|---|---|
| Column 1, | Line 20, | after "shredded" cancel "chese" and insert ---cheese--- | |
| Column 2, | Line 27, | after "the" cancel "basis" and insert ---bases--- | |
| Column 4, | Line 51, | after "liner" cancel "26" and insert ---21--- | |
| Column 5, | Line 37, | after "be" cancel "partically" and insert ---partially--- | |
| Column 6, | Line 27, | after "synchronized" cancel "transger and insert ---transfer--- | |
| Column 7, | Line 8, | after "5" cancel "and" and insert ---on--- | |
| Column 8, | Line 22, | after "a" cancel "Feflon" and insert ---Teflon--- | |
| Column 9, CLAIM 2 | Line 32, | after "preformed" cancel "parts" and insert ---pattie--- | |
| Column 10, CLAIM 7 | Line 7, | after "claim" cancel "8" and insert ---6--- | |
| Column 10, CLAIM 8 | Line 29, | after "forming" cancel "meats" and insert ---means--- | |

UNITED STATES PATENT AND TRADEMARK OFFICE
CERTIFICATE OF CORRECTION

PATENT NO. : 3,943,601

DATED : March 16, 1976

INVENTOR(S) : HARVEY G. KUHLMAN

It is certified that error appears in the above–identified patent and that said Letters Patent are hereby corrected as shown below:

Column 10, Line 55, CLAIM 10     after "said" cancel "opening" and insert ---openings---

Signed and Sealed this

Twentieth Day of July 1976

[SEAL]

Attest:

RUTH C. MASON
*Attesting Officer*

C. MARSHALL DANN
*Commissioner of Patents and Trademarks*